(12) United States Patent
Reid, Jr.

(10) Patent No.: US 9,126,568 B1
(45) Date of Patent: Sep. 8, 2015

(54) INTEGRATED JACKING SYSTEM

(71) Applicant: J. Hugh Reid, Jr., Long Pond, PA (US)

(72) Inventor: J. Hugh Reid, Jr., Long Pond, PA (US)

( * ) Notice: Subject to any disclaimer, the term of this patent is extended or adjusted under 35 U.S.C. 154(b) by 0 days.

(21) Appl. No.: 14/556,797

(22) Filed: Dec. 1, 2014

(51) Int. Cl.
  *B60S 9/08*  (2006.01)

(52) U.S. Cl.
  CPC .......................................... *B60S 9/08* (2013.01)

(58) Field of Classification Search
  CPC ................ B66F 7/24; B66F 9/00; B60S 9/04; B60S 9/12; B60S 9/18
  See application file for complete search history.

(56) References Cited

U.S. PATENT DOCUMENTS

| | | | |
|---|---|---|---|
| 3,888,464 A | | 6/1975 | Felsen |
| 4,605,086 A | * | 8/1986 | Marom ......................... 180/202 |
| 6,404,073 B1 | * | 6/2002 | Chiang ......................... 307/10.1 |
| 6,910,680 B1 | * | 6/2005 | Geller ............................ 254/423 |
| 6,991,221 B1 | * | 1/2006 | Rodriguez ..................... 254/423 |
| 7,017,701 B2 | * | 3/2006 | Flynn et al. .................... 180/282 |
| 2002/0100901 A1 | * | 8/2002 | Topelberg et al. ............ 254/423 |
| 2014/0217342 A1 | | 8/2014 | Donduror et al. |
| 2014/0231732 A1 | * | 8/2014 | Piuian et al. ................... 254/423 |

* cited by examiner

*Primary Examiner* — Lee D Wilson
(74) *Attorney, Agent, or Firm* — Thomas J. Germinario

(57) ABSTRACT

An integrated jacking system includes built-in jacks for each wheel of the vehicle. Electric motor-driven screw or worm-gear jacks are welded to the vehicle frame or unibody aft of the front wheels and forward of the rear wheels. The four jack screws each terminate on the lower end in a rotatable ball-jointed footing adaptable to uneven drive surfaces beneath the vehicle wheels. The integrated jacking system is controlled by the vehicle computer through a passcode-accessible central jacking control interface. The vehicle computer is programmed to implement safety protocols: allowing only one wheel at a time to be jacked up, limiting jacking height of a wheel to not more than six inches (6") off the ground, and disabling the jacking system if the grade of the underlying surface exceeds twenty percent (20%) or if the parking brake is not set.

2 Claims, 5 Drawing Sheets

INTEGRATED JACKING SYSTEM

FIELD OF INVENTION

The present invention relates generally to the field of devices for jacking motor vehicles, and more particularly to built-in, integrated, motor driven, computer controlled jacking systems.

BACKGROUND OF THE INVENTION

Conventional jacks for changing tires on a motor vehicle are difficult and dangerous to use. Darkness, inclement weather and rough terrain can make their use even more hazardous. They are also susceptible to misuse by jacking on steep grades, jacking too high or without setting the parking brake.

There is a need for a jacking system which is built right into the frame or unibody of a vehicle and is driven by electric motors controlled by the vehicle computer so as to restrict jacking to one wheel at a time, at a limited height on relatively level terrain.

SUMMARY OF THE INVENTION

The present invention is an integrated jacking system that includes built-in jacks for each wheel of the vehicle. Electric motor-driven screw or worm-gear jacks are welded to the vehicle frame or unibody aft of the front wheels and forward of the rear wheels. The four jack screws each terminate on the lower end in a rotatable ball-jointed footing adaptable to uneven drive surfaces beneath the vehicle wheels. The integrated jacking system is controlled by the vehicle computer through a passcode-accessible central jacking control interface. The vehicle computer is programmed to implement safety protocols: allowing only one wheel at a time to be jacked up, limiting jacking height of a wheel to not more than six inches (6") off the ground, and disabling the jacking system if the grade of the underlying surface exceeds twenty percent (20%) or if the parking brake is not set.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
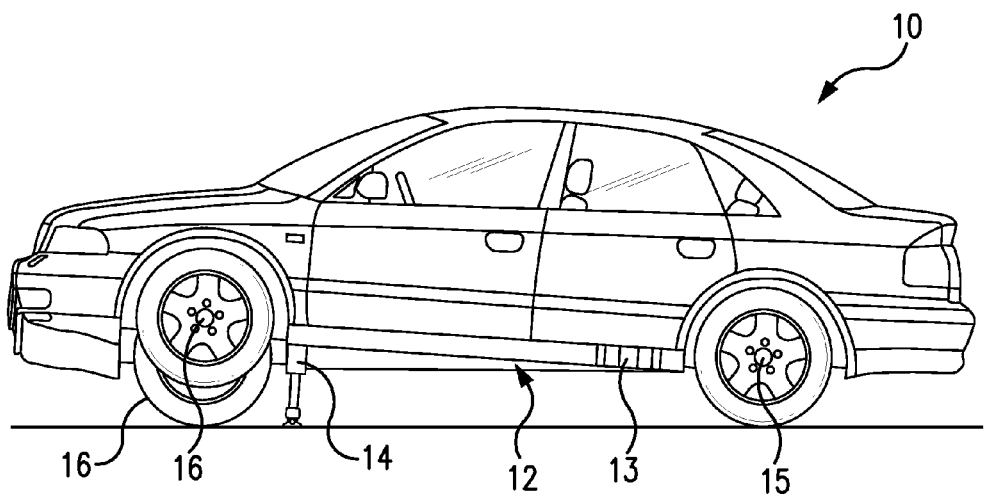
FIG. 1 is a side profile view of a motor vehicle equipped with one embodiment of the integrated jacking system of the present invention.
Figure 2:
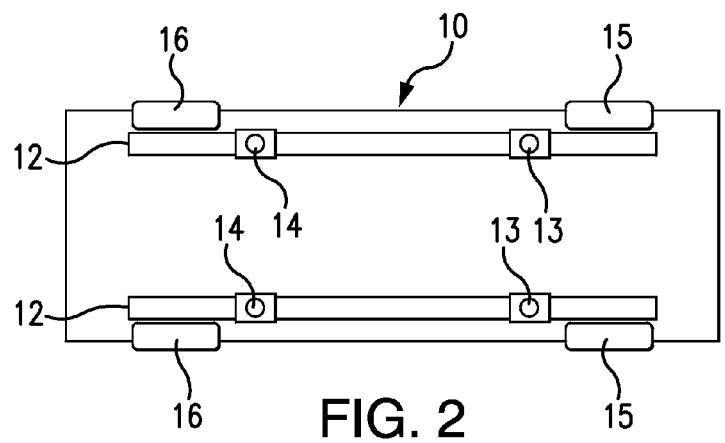
FIG. 2 is a bottom plan view of a motor vehicle equipped with one embodiment of the integrated jacking system of the present invention.

Referring to FIGS. 1 and 2, the exemplary integrated jacking system 10 comprises four mechanical jacking units 13 14, which are integrally welded to the frame or unibody of a motor vehicle 12. The two rear jacking units 13 are located proximately forward of the vehicle's rear wheels 15, while the two front jacking units 14 are located proximately aft of vehicle's front wheels 16.

Figure 3:
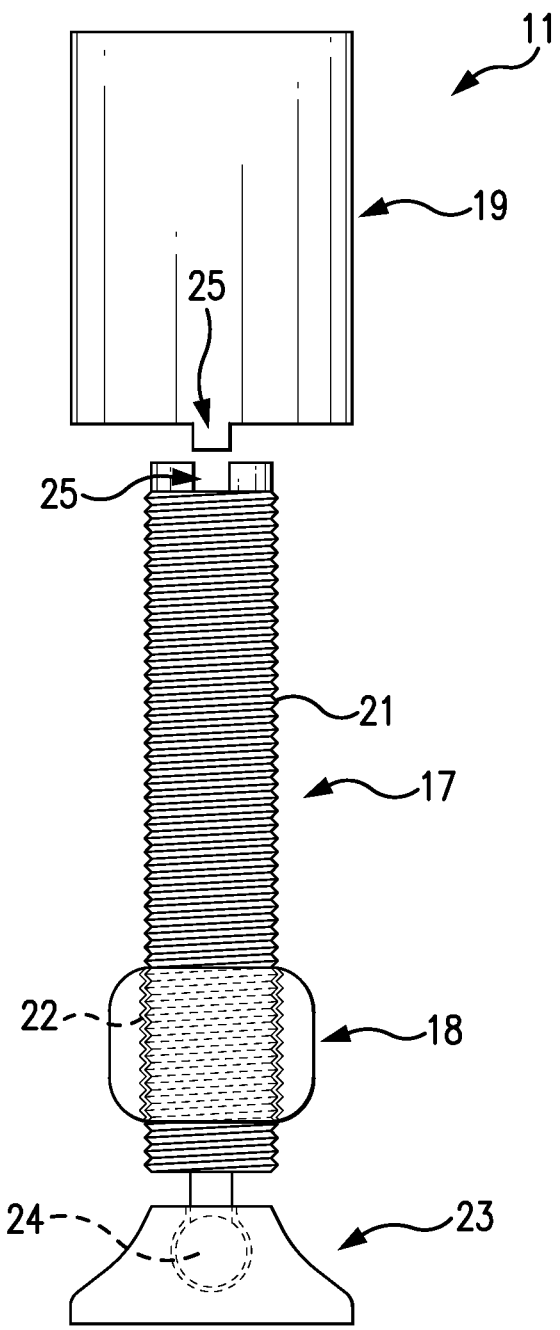
FIG. 3 is a perspective view of a direct-drive type motorized mechanical jacking unit for one embodiment of the integrated jacking system of the present invention.
Figure 4:
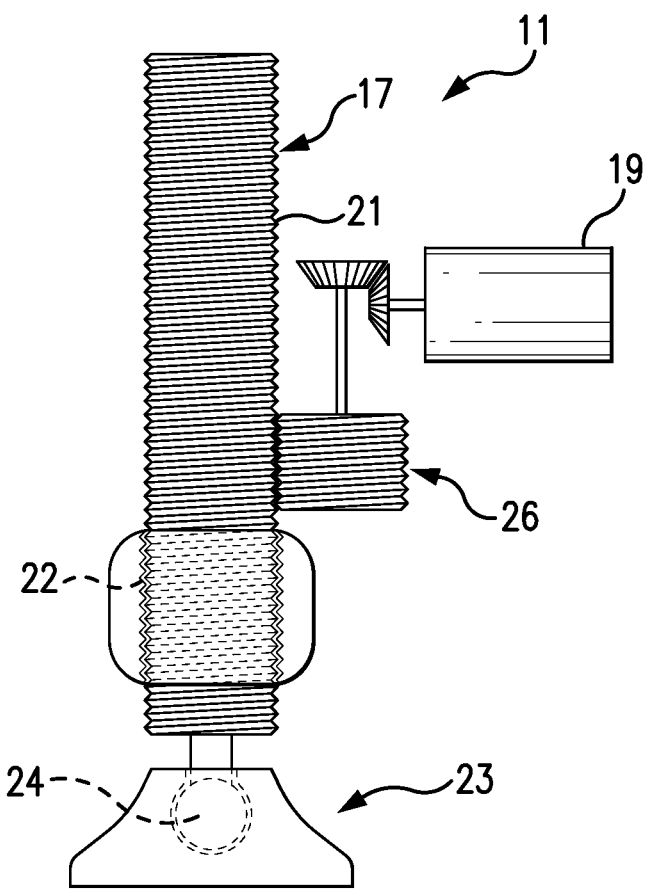
FIG. 4 is a perspective view of a worm-gear-drive type motorized mechanical jacking unit for one embodiment of the integrated jacking system of the present invention.

Referring to FIGS. 3 and 4, each jacking unit 11 comprises a jack screw 17, a unit support 18, which is welded to vehicle's frame or unibody 12, and a reversible electric motor 19. The jack screw 17 has external threading 21 which conjugately engages internal threading 22 of the unit support 18. The jack screw 17 extends vertically downward from the vehicle's frame or unibody 12 through the unit support 18. At the lower end of each jack screw 17 is a footing member 23 rotatably attached by a ball-joint 24.

Each electric motor 19 is electrically connected to the vehicle's power source (not shown) and is mechanically connected to one of the jack screws 17. The motor's 19 mechanical connection to the jack screw 17 can be a direct connection 25, as illustrated in FIG. 3, or through a worm gear 26, as shown in FIG. 4, or through one or more reduction gears (not shown). When the motor 19 is energized, it generates a torque which is imparted to the jack screw 17, thereby causing the jack screw 17 to rotate. In the motor's forward direction, the jack screw 17 rotates and threads downward through the unit support 18, so that the footing member 23 engages the underlying surface beneath the vehicles wheels and lifts the wheel proximate to the jacking unit 11 to a designated jacking height, which is preferably not more than six inches (6") above the underlying surface, at which height the wheel can be removed and replaced.

After the wheel is replaced, the electric motor is reversed, causing the jack screw 17 to rotate and thread upward through the unit support 18, so that the footing member 23 disengages and retracts from the underlying surface and the replacement wheel is lowered down to the underlying surface.

Figure 5:
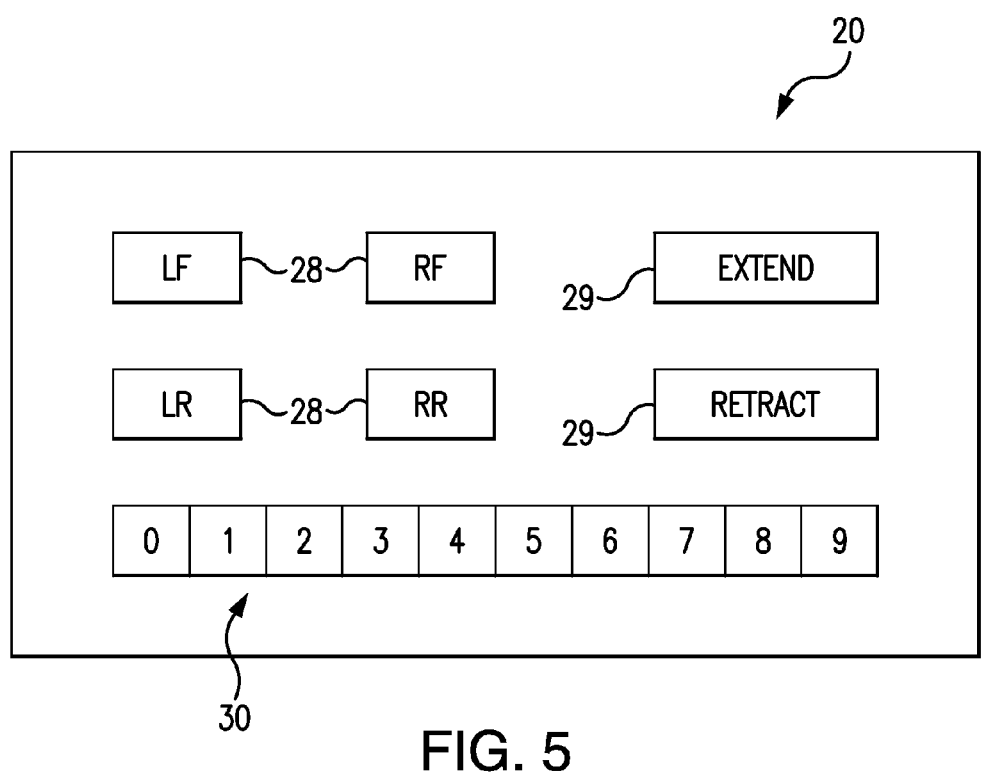
FIG. 5 is a plan view of an exemplary jacking control interface for one embodiment of the integrated jacking system of the present invention.
Figure 6:
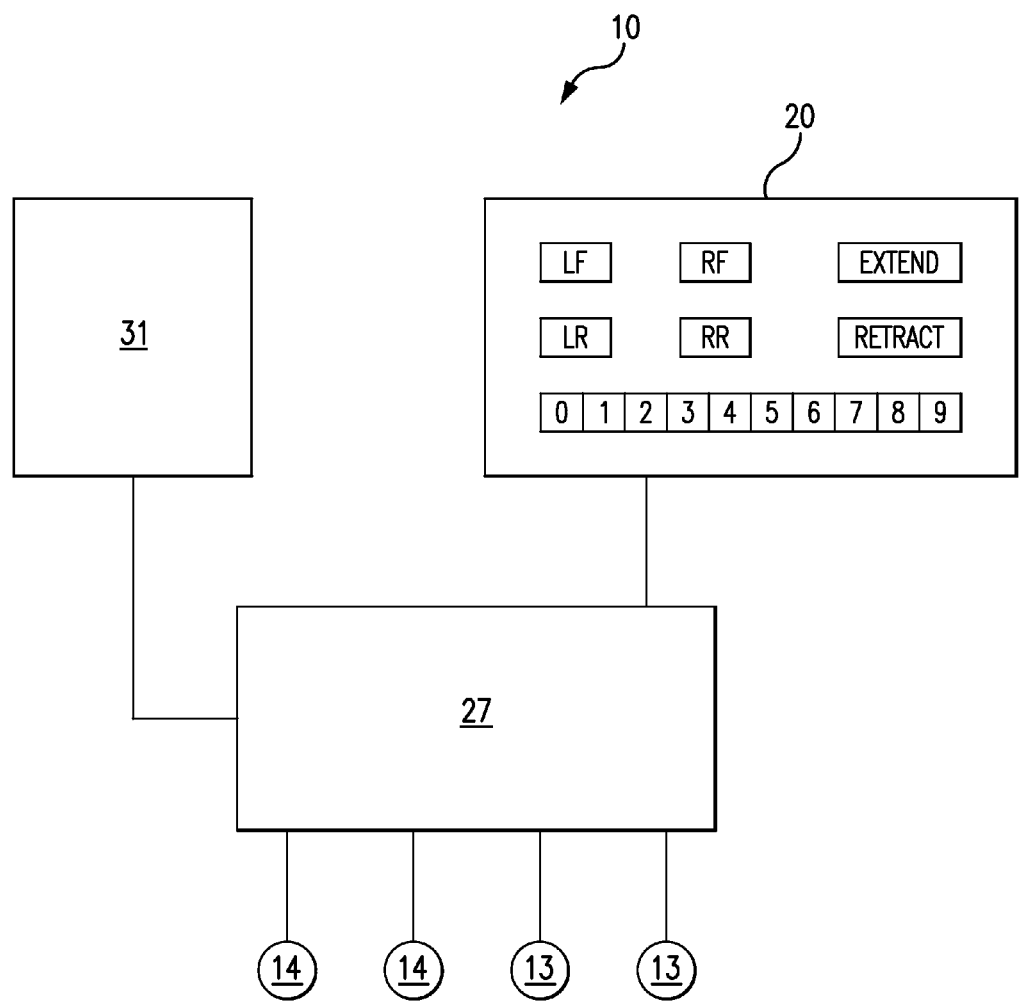
FIG. 6 is a schematic diagram of an exemplary control system for one embodiment of the integrated jacking system of the present invention.

Referring now to FIGS. 5 and 6, the jacking units 11 are electrically or wirelessly connected to the vehicle computer 27 through a central jacking control interface 20, through which the vehicle computer 27 controls the electric motors 19. As shown in FIG. 5, an exemplary control interface 20 can have buttons and/or switches by which the user can select the wheel to be jacked 28 and the direction of jacking 29, either extend or retract. The vehicle computer 27 requires a passcode, through keys provided in the control interface 30, so that children or other unauthorized users do not misuse the jacking system. To prevent distabilization of the vehicle, the computer 27 allows only one wheel to be jacked at a time and terminates jacking when the designated maximum jacking height is reached—preferably six inches (6") above the underlying surface. The computer 27 is also programmed to disable the control interface 20 if the parking brake is not engaged.

Optionally, the jacking system 10 also includes a grade sensor 31 connected to the computer 27. When the grade sensor 31 detects a grade of the underlying surface exceeding a specified maximum—preferably 20%—above which jacking would cause instability, the computer 27 is programmed to disable the control interface 20.

Optionally, the vehicle computer 27 can also be programmed to activate the vehicle's emergency lights (not shown) whenever one of the jacking units 11 is activated.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A jacking system for a motor vehicle, having a unibody or a frame, and having a parking brake, and having a vehicle computer, and having four wheels, the jacking system comprising:
    four mechanical jacking units, which are integral to the unibody or the frame,
        wherein each of the jacking units is proximate to one of the four wheels, and
        wherein each of the jacking units comprises a jack screw, a unit support, and a reversible electric motor;
    wherein the jack screw has external threading which conjugately engages internal threading of the unit support;
    wherein the unit support is welded to the frame or the unibody of the motor vehicle;
    wherein the jack screw extends vertically downward from the motor vehicle unibody or frame through the unit support and has a lower end consisting of a rotatable ball-jointed footing member;
    wherein the electric motor is electrically connected to a power source within the vehicle and is mechanically connected to the jack screw, such that, when the electric motor is energized, the electric motor generates a torque which is imported to the jack screw, thereby causing the jack screw to rotate;
    wherein the electric motor has a forward mode, such that, when the electric motor is energized in the forward mode, the electric motor impacts a forward torque to the jack screw, thereby causing the jack screw to rotate threadably downward through the unit support, such that the footing member engages an underlying surface beneath the wheels of the vehicle, so as to lift the wheel proximate to the jacking unit to a designated jacking height at which the wheel can be removed and a replacement wheel can be installed;
    wherein the electric motor has a reverse mode, such that, when the electric motor is energized in the reverse mode, the electric motor impacts a reverse torque to the jack screw, thereby causing the jack screw to rotate threadably upward through the unit support, such that the footing member disengages and retracts from the underlying surface, so as to lower the replacement wheel proximate to the jacking unit down to the underlying surface;
    wherein the jacking units are electrically or wirelessly connected to the vehicle computer through a central jacking control interface, through which the vehicle computer controls the electric motor;
    wherein the vehicle computer is programmed to require entry of a passcode for use of the jacking control interface, and to allow only one wheel to be jacked at a time, and to discontinue jacking when the designated jacking height is reached; and
    wherein the vehicle computer is programmed to disable the jacking control interface when the parking brake is not engaged.

2. The jacking system of claim 1, further comprising a grade sensor, which is electrically or wirelessly connected to the vehicle computer, wherein the grade sensor detects a surface grade of the underlying surface, and wherein the vehicle computer is programmed to disable the jacking control interface when the surface grade exceeds a specified maximum, above which jacking would cause instability of the motor vehicle.

* * * * *